P. A. KINGSTON & B. BERG.
FLEXIBLE UNIVERSAL JOINT.
APPLICATION FILED AUG. 5, 1908.
955,595.
Patented Apr. 19, 1910.
3 SHEETS—SHEET 3.
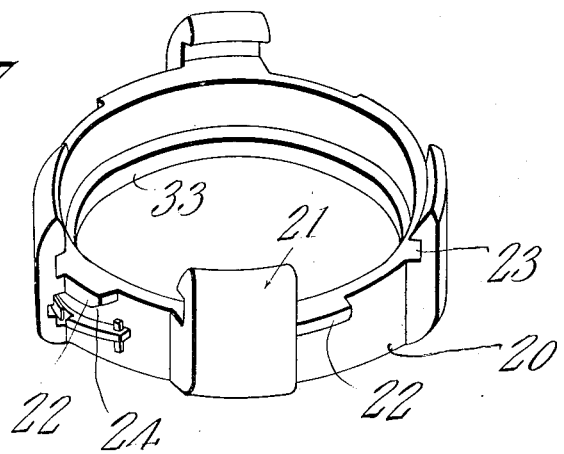
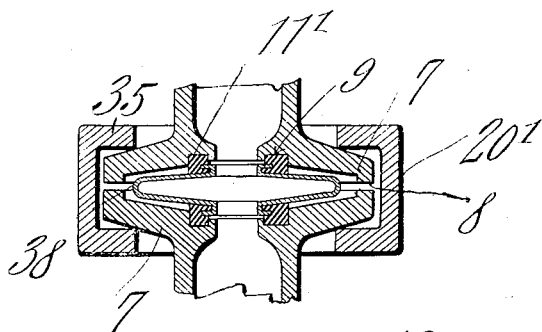
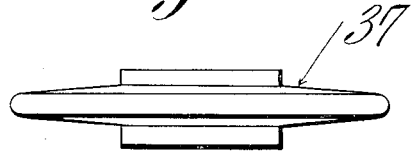

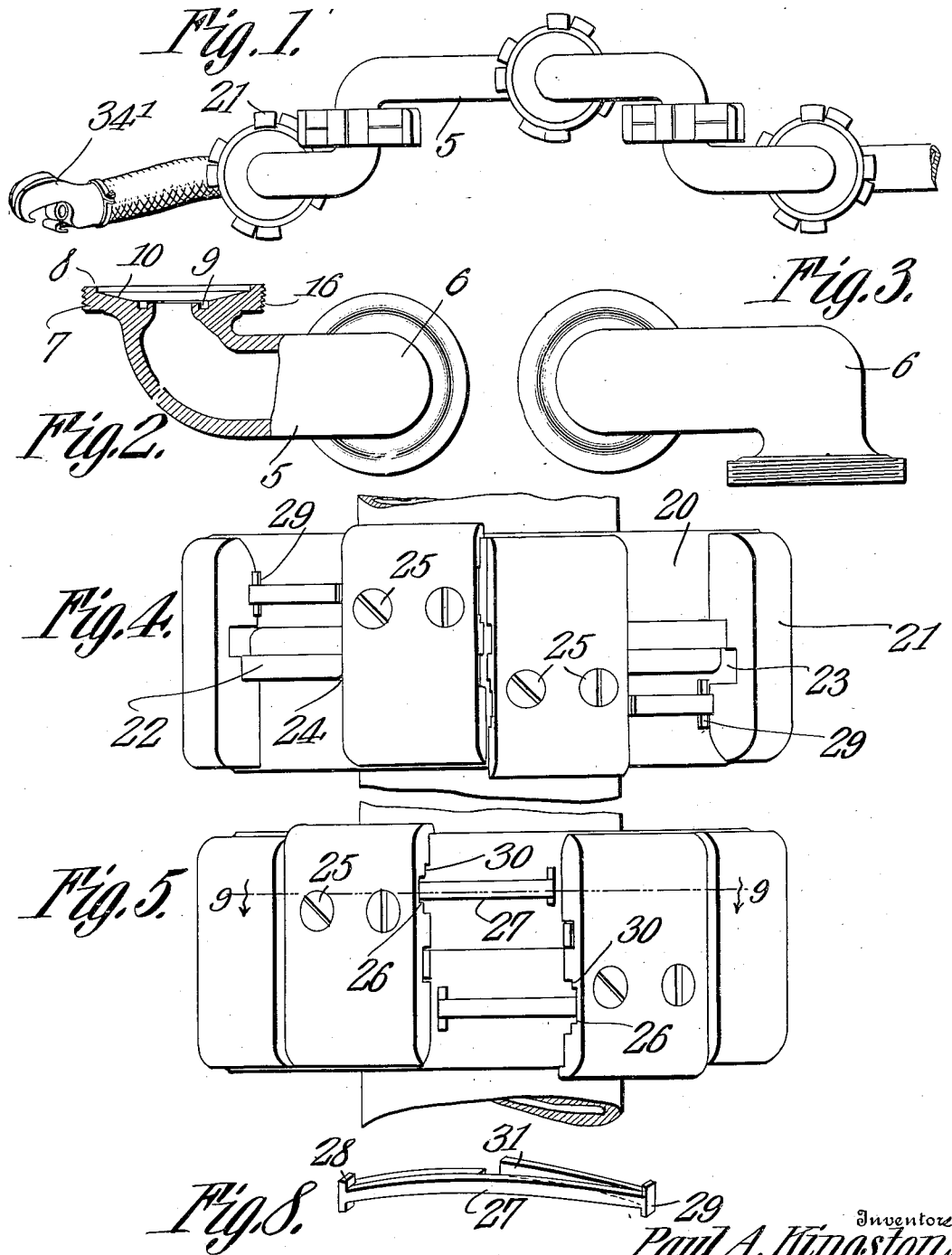

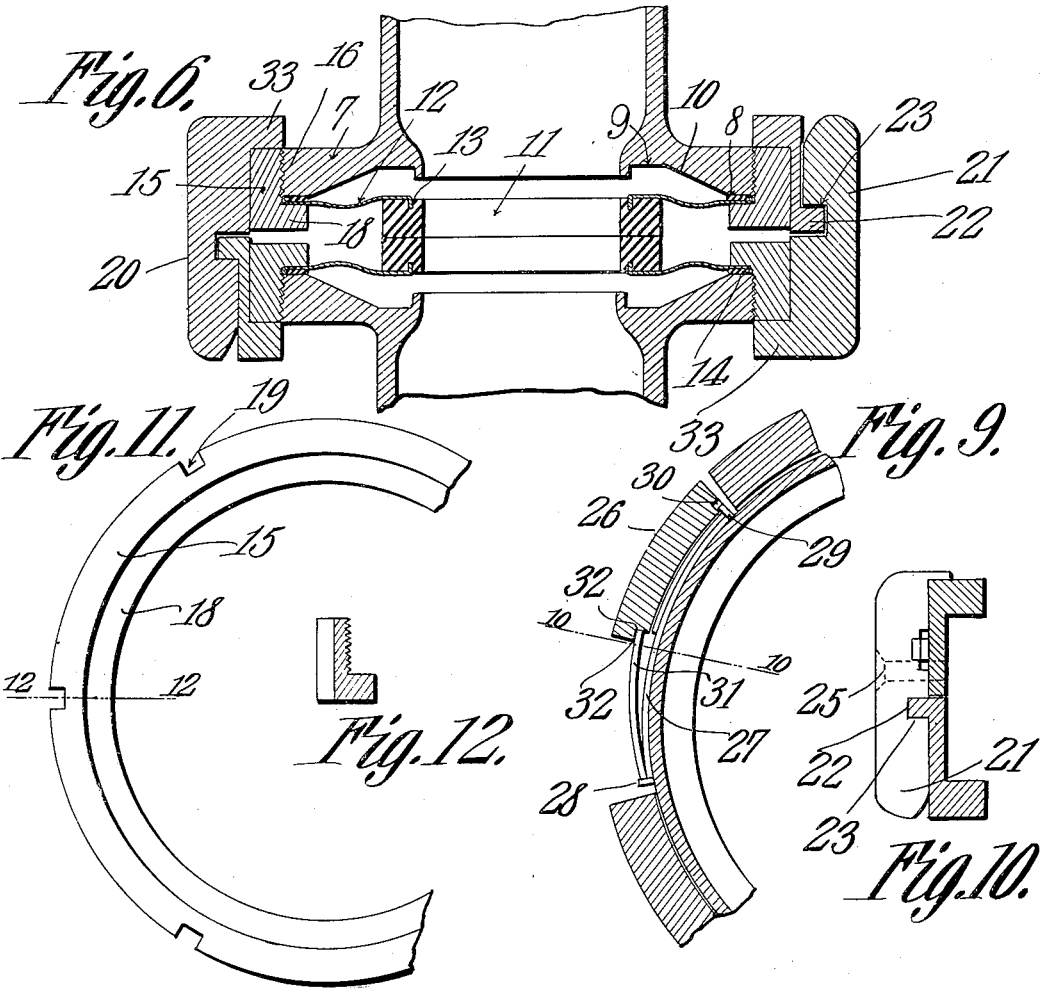

UNITED STATES PATENT OFFICE.

PAUL A. KINGSTON AND BERNHARD BERG, OF DANVILLE, ILLINOIS.

FLEXIBLE UNIVERSAL JOINT.

955,595.  Specification of Letters Patent.  Patented Apr. 19, 1910.

Application filed August 5, 1908. Serial No. 447,100.

*To all whom it may concern:*

Be it known that we, PAUL A. KINGSTON and BERNHARD BERG, citizens of the United States, residing at Danville, in the county of Vermilion, State of Illinois, have invented a new and useful Flexible Universal Joint, of which the following is a specification.

This invention relates to pipe couplings and more particularly to a universal coupling for uniting the adjacent ends of train pipes.

The object of the invention is to provide a comparatively simple and inexpensive joint or coupling in which the pipe or hose sections connected therewith may be swung in any direction.

A further object is to provide a universal joint in which the internal pressure of the fluid in the pipes may be utilized to increase and preserve tightness of the joint thereby to prevent leakage.

A further object is to provide a novel form of expansible gasket, and means for retaining the same on opposite ends of adjacent pipe sections.

A further object is to provide a locking device including co-acting clamping collars arranged to embrace the abutting ends of adjacent pipe sections and provided with interlocking parts.

A further object is to provide the clamping collar with oppositely disposed ears or lugs having transverse seating recesses formed therein for the reception of spring locking members, the latter being slidably mounted on the collars and provided with yieldable tongues adapted to engage the adjacent ears or lugs for preventing rotation of one collar relative to the other.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of a universal pipe coupling constructed in accordance with our invention. Fig. 2 is a longitudinal sectional view partly in elevation of one of the pipe sections comprising the coupling detached. Fig. 3 is a top plan view of the same. Fig. 4 is an enlarged side elevation showing the clamping collars in locked position. Fig. 5 is a similar view showing the clamping collar unlocked to permit separation of the adjacent pipe sections. Fig. 6 is a transverse sectional view of Fig. 4. Fig. 7 is a perspective view of one of the clamping collars detached. Fig. 8 is a detail perspective view of one of the spring locking members detached. Fig. 9 is a transverse sectional view taken on the line 9—9 of Fig. 5. Fig. 10 is a vertical sectional view taken on the line 10—10 of Fig. 9. Fig. 11 is a top plan view of a portion of one of the clamping rings for retaining the gaskets in position on the pipe sections. Fig. 12 is a transverse sectional view taken on the line 12—12 of Fig. 11. Fig. 13 is a transverse sectional view illustrating a modified form of the invention. Fig. 14 is a side elevation of the expansible gasket shown in Fig. 13 detached.

Similar numerals of reference indicate corresponding parts in all of the figures of the drawings.

The improved metallic coupling forming the subject matter of the present invention includes a pipe section 5 having a longitudinally disposed body portion, the opposite ends of which are offset to produce extensions or elbows 6, preferably arranged at right angles to each other, as shown, and each provided with a laterally extending flange 7 for engagement with the flange of a mating pipe section when several of said sections are united to form a universal joint the pipe section 5 with the elbows 6 and flanges 7 being all formed in one piece. The flange 7 of each pipe section is formed with a marginal rib 8 and an annular seating groove or recess 9 for the purpose hereinafter referred to, the exposed face of each flange between the rib 8 and the groove 9 being inclined in the direction of the mouth of the pipe section, as indicated at 10.

Disposed at the mouth of each pipe section is an expansible washer or gasket including a ring 11 having a metallic disk 12 extending laterally therefrom and arranged to span the inclined portion 10 of said pipe section. The inner edge of each metallic disk 12 is bent laterally to form an anchoring flange 13 fitting within a correspondingly shaped groove in the adjacent ring 11, while the outer edge of the disk is bent upon itself to form a curved flange for engagement with a yieldable packing strip 14 formed of asbestos, leather, rubber or other suitable material. The packing strip or ring 14 bears against the rib 8 and is held in position thereon by a clamping ring 15 so as to effectually prevent leakage when adjacent sections of pipe are coupled. The clamping ring is interiorly threaded for engagement with the exterior threads 16 on the adjacent flange 7, said clamping ring being provided with an inwardly extending flange 18 which bears against the packing ring or strip 14, as best shown in Fig. 6 of the drawing. The clamping ring 15 is also formed with one or more notches or recesses 19 arranged to receive a spanner tool or wrench so that the ring may be conveniently positioned on or removed from the adjacent pipe section. The resiliency of the metal forming the disk 12 is such as to cause the rings 11 to normally and yieldably engage each other, the expansion of the steam or other fluid in the pocket formed between the disk 12 and inclined portion of the head 7 serving to maintain a tight joint between the rings 11 and assist in preventing leakage.

As a means for locking adjacent pipe sections in coupled position suitable clamping collars 20 are provided, each formed with a plurality of spaced ears or lugs 21 disposed in opposite directions and arranged to bear against the exterior wall of the mating clamping collar. Extending laterally from the exterior walls of the clamping collars at each ear or lug 21 is a segmental locking rib 22 adapted to enter a correspondingly shaped locking recess 23 formed in the adjacent lug of the mating collar when said collars are rotated or partially rotated, thereby to prevent accidental separation of the same. The free end of each locking rib 22 is inclined or beveled at 24 to assist in guiding said rib within the adjacent recess 23 and thus prevent binding or wedging action between the parts. One of the locking ears or lugs of each clamping collar is detachably secured to the body thereof by screws or similar fastening devices 25, there being transverse grooves 26 formed in the detachable ears or lugs above the seating grooves 23 to permit the passage of spring pressed locking members 27. The locking members 27 are slidably mounted on the exterior walls of the clamping collars and are each preferably formed of an elongated body portion curved to conform to the exterior wall of the adjacent clamping collar and having its opposite ends provided with T shaped heads 28 and 29, which latter engage correspondingly shaped sockets 30 formed in the detachable ears or lugs of said clamping collars when the latter are in both locked and unlocked position. The sockets 30 are formed in the opposite faces of each detachable ear or lug and communicate with the adjacent lug receiving groove 26, said sockets being deep enough to receive and entirely house the heads 28 and 29 when the clamping collars are in unlocked position so as not to offer any obstruction to the passage of the lugs, when said collars are separated to permit detachment of the pipe sections. Each locking member 27 is provided with a spring tongue 31, the free end of which is adapted to bear against a stop shoulder 32 arranged at the socket 30 of each detachable ear or lug so as to lock the clamping collars against rotation. It will thus be seen that when the clamping collars are moved to the position shown in Fig. 4 of the drawings, the lugs 21 adjacent the inner heads 28 of the locking members will bear against said heads and force the locking members through the seating grooves 26 until the free end of the spring tongues 31 register with the stop shoulders 32, in which event the terminals of said tongues will spring laterally into engagement with the shoulders 32 and lock the collars in operative position.

In order to release the clamping collars to permit detachment of the pipe sections it is merely necessary to press inwardly on the free ends of the spring tongues 31 and at the same time force the detachable lugs of the clamping collars toward each other to the position shown in Fig. 5 of the drawing, when said clamping collars may be readily separated. As the clamping collars are rotated to the position shown in Fig. 5, the detachable ears or lugs of said clamping collars will bear against the outer heads 29 of said locking members and force the locking members within the seating grooves 26 until the heads 29 enter the sockets 30 thus permitting ready separation of the clamping collars, in the manner before described.

Each clamping collar is provided with an inwardly extending flange 33 which bears against the adjacent clamping ring 15 and prevents rotation of the latter when the clamping collars are positioned at the juncture of the pipe sections to be united.

In effecting the union of adjacent pipe sections the washers or rings 11 are first placed in position on the heads 7 of the pipe sections and locked in position thereon by means of the clamping rings 15, after which a clamping collar is then positioned on each pipe section with the flange 33 in engagement with the adjacent clamping ring 15 of said section. The pipe sections are then brought together and one clamping collar rotated with respect to the other which causes the ribs 22 to enter the seating grooves 23 and the spring locking members 27 to engage the stop shoulders 32 and clamp the several parts in coupled position in the manner before described. When several of the pipe sections are coupled in the manner shown in Fig. 1 of the drawings, said pipe sections may be moved in any direction without binding or wedging action between the parts thus forming a universal joint that is particularly desirable and effective in uniting adjacent sections of train pipes and the like.

When the coupling is assembled for connecting adjacent train pipe sections one of said sections will be equipped with the standard type of coupling head, indicated at 34′, in Fig. 1 of the drawings.

Attention is here called to the fact that when several of the pipe sections are coupled in the manner shown in Fig. 1 of the drawings, each pipe section 5 will be disposed in a plane below and parallel with the succeeding pipe section, this particular disposition of the coupling members permitting the pipe to be bent upwardly and passed over beams or laterally so as to avoid side projections.

In Fig. 13 of the drawings there is illustrated a modified form of the invention in which the exterior walls of the flanges 7 are devoid of threads, the pipe sections being held in assembled or coupled position by a clamping collar 20′ preferably formed in two sections and pivotally connected. In this form of the device the sections of the clamping collar 20′ are provided with inwardly extending flanges 35 arranged to bear against the outer faces of the flanges 7, said outer faces being slightly inclined so that when the sections of the clamping collars 20′ are drawn together the adjacent pipe sections will be locked against accidental separation. In this form of the device an expansible gasket 37 of the form shown in Fig. 14 is employed. The expansible gasket 37 comprises spaced metallic rings 11′ preferably cast or otherwise formed of brass and connected by a sheet metal diaphragm 38 also preferably formed of brass, the inner ends of the metal forming the diaphragm 38 being disposed in contact with and secured to the adjacent faces of the rings 11′ and thence bent laterally and seated in circumferential grooves or kerfs, thereby to firmly anchor the rings and prevent accidental separation of the same. The rings 11′ are designed to enter the seating grooves 9, shown in Fig. 2 of the drawings, with the diaphragm 38 disposed between the inclined faces 10 of adjacent flanges 7, said flanges being coupled and the rings locked in the seating groove 9 by means of the clamping collar 20′. It will here be noted that when steam or other fluid is admitted to the pipe sections, said fluid will enter the diaphragm 38 and partially expand the same so as to assist in retaining the rings 11′ within the seating grooves 9, thus effectually preventing the escape of fluid either at the grooves 9 or between the flanges 7 and clamping collar 20′.

While the coupling is especially designed for use in connection with train pipes, said coupling is particularly effective when employed for uniting adjacent section of hose, such as fire hose, and in which case it is preferred to use the gasket shown in Fig. 18 of the drawings at the juncture of mating hose sections.

It will of course be understood that the gaskets may be made in different sizes and shapes according to the conditions under which they are used without departing from the spirit of the invention.

Having thus described the invention what is claimed is:

1. A device of the class described comprising pipe sections having extensions arranged at an angle to each other and to the body of the pipe section and each provided with a flange having its exterior walls threaded, each pipe section with its extensions and flanges being formed in one piece, a detachable disk, a gasket carried by each pipe section through the instrumentality of the detachable disk, a clamping ring engaging the threads of each flange for forcing the gasket in engagement therewith, and means for coupling said sections.

2. A device of the class described comprising a one-piece straight pipe section having extensions integral therewith and arranged at an angle to each other and to the body of the pipe section, and each provided with an integral lateral flange adapted to register with the flange of a mating section, a double expansible gasket adapted to be interposed between the flanges of mating sections through the instrumentality of a spring disk, and means for coupling said sections.

3. A device of the class described comprising a plurality of straight pipe sections having oppositely disposed extensions arranged at an angle to each other and to the body of the respective pipe section, and each provided with a laterally extending flange adapted to register with the flange of a mating section, the straight portion of one pipe section being disposed below and in a plane parallel to the straight portion of the mating pipe section, gaskets adapted to be interposed and locked between the flanges of mating sections by a spring disk, and clamping members for coupling the flanges of said mating sections.

4. A device of the class described comprising mating pipe sections each provided with a laterally extending flange having exterior threads, a gasket extending transversely across the end of each pipe section and bearing against the adjacent flange, a clamping ring engaging the threads on each flange and bearing against the gasket, and co-acting clamping collars embracing the flanges of both sections and provided with interlocking parts.

5. A device of the class described comprising mating pipe sections, a gasket extending across one end of each section, means for retaining the gaskets in position, and a coupling device surrounding the pipe sections and engaging the gasket retaining means for effecting the union of said pipe sections.

6. A device of the class described comprising mating pipe sections, a gasket extending across one end of each section, means for locking the gaskets in engagement with said sections, co-acting clamping collars disposed at the juncture of said sections and provided with flanges bearing against the gasket locking means, and means for locking the collars against rotation.

7. A device of the class described comprising mating pipe sections, clamping collars disposed at the juncture of said sections and provided with oppositely disposed lugs having transverse seating recesses formed therein, there being locking grooves formed in some of the lugs, segmental ribs extending laterally from the clamping collars and adapted to enter the adjacent seating recesses in the lugs when said collars are partially rotated, and a locking device carried by each collar and adapted to enter the adjacent locking groove.

8. A device of the class described comprising mating pipe sections, co-acting clamping collars disposed at the juncture of said pipe sections and provided with oppositely disposed lugs having transverse recesses formed therein, some of said lugs being provided with locking grooves, ribs extending laterally from the clamping collars and adapted to enter the grooves in adjacent lugs, and a spring locking member mounted on each clamping collar to slide about the longitudinal axis thereof and adapted to enter the adjacent locking groove when said clamping collars are rotated.

9. A device of the class described comprising mating pipe sections, co-acting collars disposed at the juncture of said sections and provided with oppositely disposed lugs having seating recesses formed therein, some of said lugs being provided with locking grooves, there being shoulders formed in the opposite ends of the grooves, ribs carried by the clamping collars and arranged to enter the seating recesses in the adjacent lugs, and a locking member slidably mounted within the locking groove of each clamping collar and provided with a locking tongue adapted to bear against the shoulder.

10. A device of the class described comprising mating pipe sections, co-acting clamping collars disposed at the juncture of said sections and provided with oppositely disposed lugs having transverse seating recesses formed therein, some of the lugs being provided with locking grooves, ribs carried by the clamping collars and arranged to enter the seating recesses in the adjacent lugs, locking members mounted in the clamping collars to slide about the longitudinal axis thereof and each provided with a spring tongue adapted to bear against the wall of the adjacent locking groove for preventing rotary movement of the clamping collars.

11. A device of the class described comprising mating pipe sections, clamping collars disposed at the juncture of said sections and provided with oppositely disposed lugs having locking grooves formed therein, the walls of which are formed with sockets defining stop shoulders, a locking member slidably mounted on each clamping collar and provided with a head adapted to enter the socket of the adjacent locking groove, said locking members being each provided with a spring tongue adapted to bear against the shoulder for preventing rotary movement of the clamping collars with respect to each other.

12. A device of the class described comprising mating pipe sections each provided with a laterally extending flange having its exterior walls threaded and provided with an annular rib, a gasket extending across one end of each pipe section and provided with a metallic disk, a packing secured to the peripheral edge of the disk and resting against the rib of the adjacent flange, retaining means engaging the exterior threads of the flanges and bearing against the packing ring of each pipe section, and co-acting clamping collars engaging the packing retaining means and provided with interlocking parts.

13. A device of the class described comprising mating pipe sections each provided with a laterally extending flange having its exterior walls threaded, each flange being provided with an inclined face and having a seating groove formed therein, there being an annular rib extending laterally from the face of each flange at the inclined portion thereof, a ring disposed at the seating groove of each pipe section and having a metallic disk secured thereto, the edge of which is bent laterally, a packing ring secured to the bent portion of the metallic disk and resting on the rib of the adjacent flange, a clamping ring engaging the threaded walls of the flange and bearing against the packing ring, and co-acting clamping collars having inwardly extending flanges for engagement with the packing retaining means, said clamping collars being provided with oppositely disposed lugs, and a locking member slidably mounted on each clamping collar and adapted to engage the adjacent lug of the mating collar for locking said collars against rotary movement.

In testimony that we claim the foregoing as our own, we have hereto affixed our signatures in the presence of two witnesses.

PAUL A. KINGSTON.
    BERNHARD BERG.

Witnesses:
 LIZZIE KILEY,
 E. L. SMITH.